United States Patent

[11] 3,565,457

| [72] | Inventors | John W. James,<br>Norwalk;<br>Richard D. Ranney, Hermosa Beach, Calif. |
|---|---|---|
| [21] | Appl. No. | 831,138 |
| [22] | Filed | June 6, 1969 |
| [45] | Patented | Feb. 23, 1971 |
| [73] | Assignee | Emdeko Distributing, Inc.<br>Salt Lake City, Utah |

[54] VEHICLE STABILIZING DEVICE
9 Claims, 6 Drawing Figs.

| [52] | U.S. Cl. | 280/150 |
|---|---|---|
| [51] | Int. Cl. | B60r 27/00 |
| [50] | Field of Search | 280/150 (D) |

[56] References Cited
UNITED STATES PATENTS
2,797,931  7/1957  Hans ..................... 280/150(D)

*Primary Examiner*—Leo Friaglia
*Assistant Examiner*—Winston H. Douglas
*Attorney*—Miketta, Glenny, Poms and Smith ABSTRACT: A vehicle stabilizing device comprising a weight member counteracting lateral or sidewise force components acting upon a vehicle and restrained against response to forces other than lateral acting upon the vehicle, such restraint means providing a novel mounting for the weight member and including top and bottom sets of shouldered roller members. The device includes a novel assembly of a housing, weight member and mounting means therefor, the housing protectively containing the weight member therewithin for virtually maintenance-free operation.

PATENTED FEB 23 1971
3,565,457
SHEET 1 OF 2
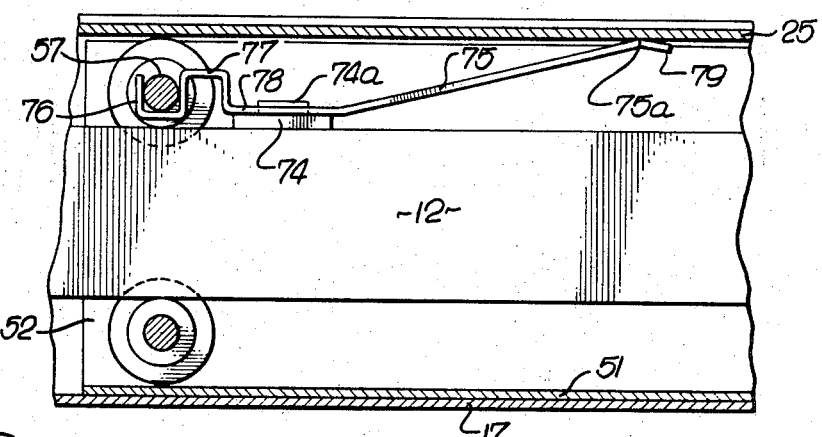
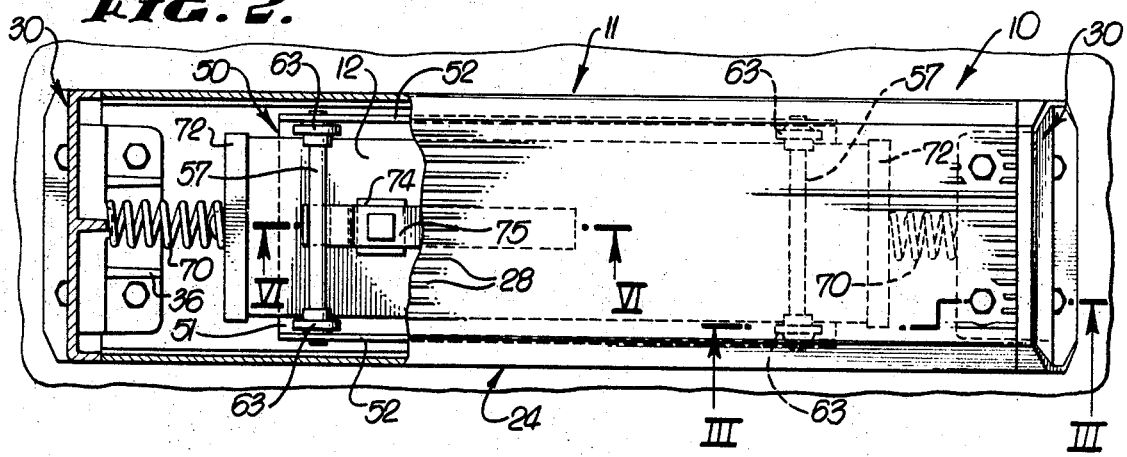
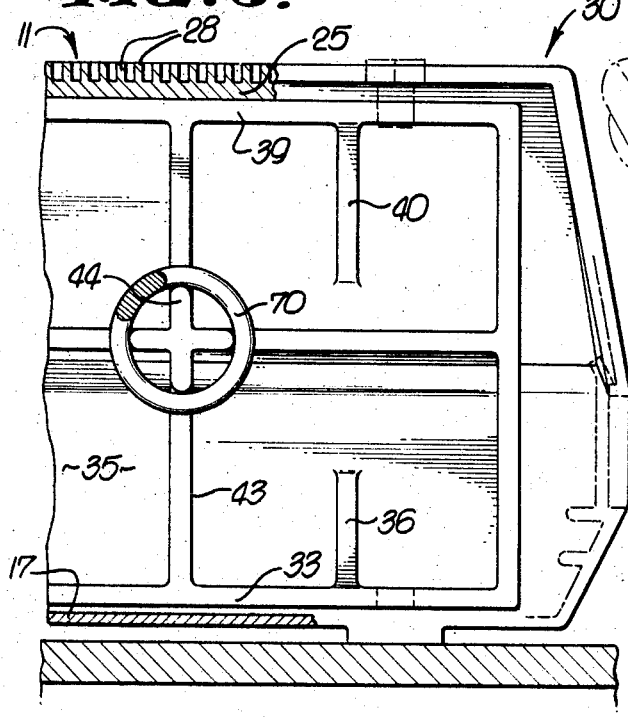
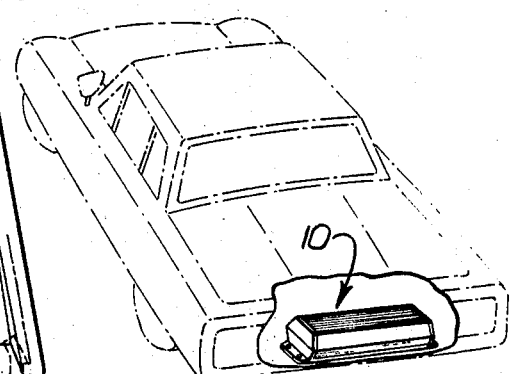
INVENTORS.
RICHARD D. RANNEY
JOHN W. JAMES
By
Miketta, Glenny, Poms & Smith
ATTORNEYS.

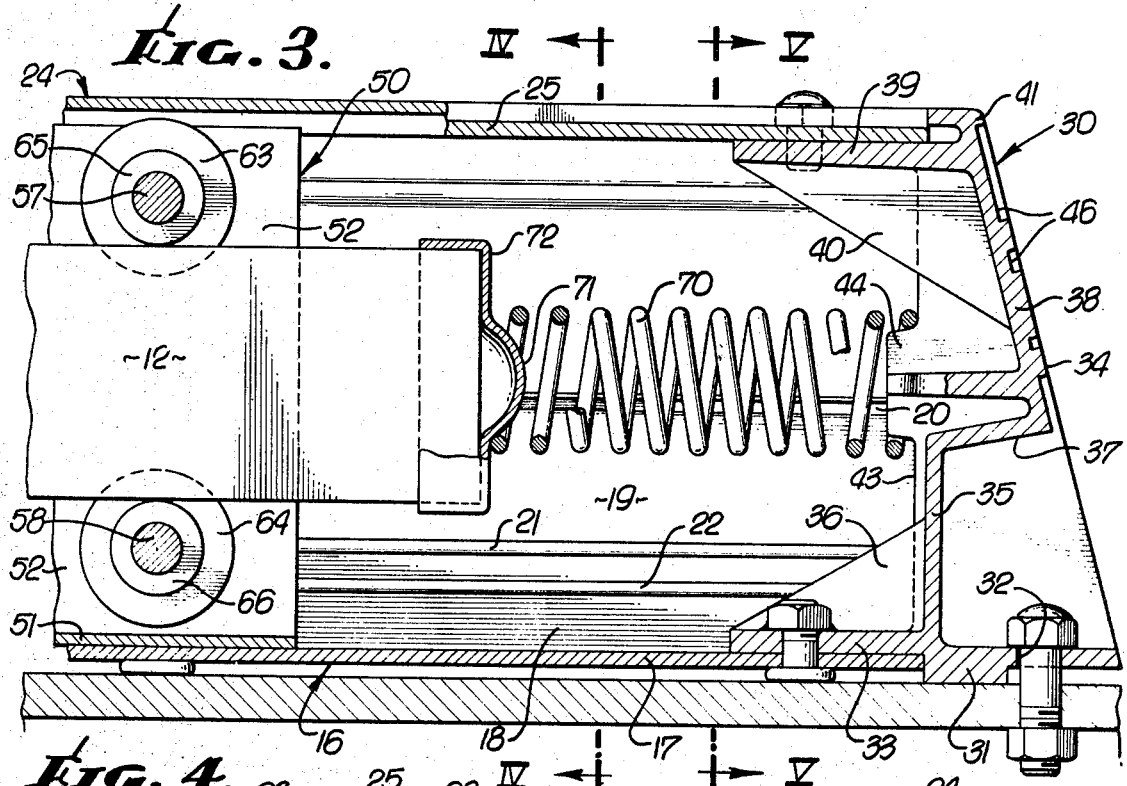
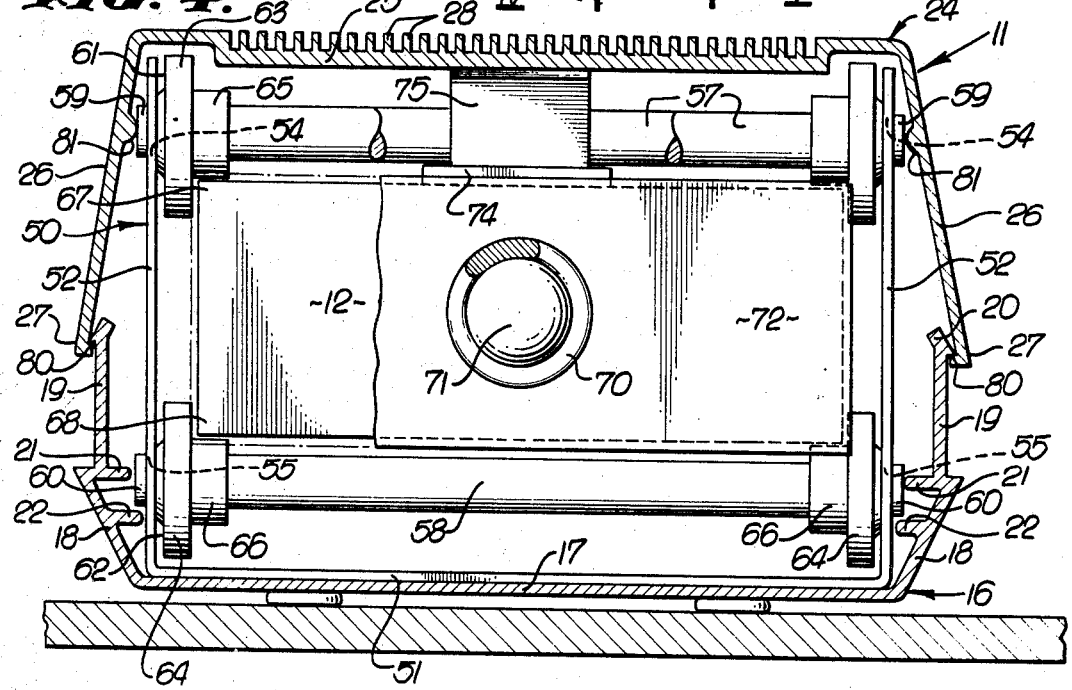

3,565,457

1

VEHICLE STABILIZING DEVICE

BACKGROUND OF THE INVENTION

Operation of automobiles at high speeds often produces conditions of side sway and skidding which may result in loss of traction or ground engagement of one or more wheels of the vehicle and sometimes loss of control thereof which may result in damage and injury to the vehicle and its occupants. Various prior proposed devices have been used to limit and control side sway and skid effects of a vehicle. Essentially, such prior proposed devices included transversely mounting a weight of some form and shape at the rear of the car for response to lateral forces acting upon the car. Such prior proposed devices were expensive, complicated, involved substantial maintenance in order to keep the weight member in a desirable responsive condition and such devices were generally costly and expensive to manufacture and install. Examples of such prior proposed vehicle antiskid devices are shown in U.S. Pat. Nos. 1,954,409; 2,582,628; and 2,633,368.

The present invention contemplates a vehicle stabilizing device which obviates some of the disadvantages of the prior proposed stabilizers and which provides a device which is immediately responsive to laterally acting force components on a vehicle so as to counteract and oppose such forces for holding the vehicle in a stable controllable condition. The device of the present invention also includes positive means for restricting response of the weight member to all other force components acting upon the car so that the weight member may most effectively perform its stabilizing function.

It is therefore a primary object of the present invention to provide a vehicle stabilizing device which is efficient and effective in operation to counteract and neutralize lateral forces tending to produce skid or sway of the vehicle.

An object of the present invention is to disclose and provide a vehicle stabilizing device of simple, inexpensive construction to manufacture and which requires virtually little maintenance.

Another object of the present invention is to disclose and provide a vehicle stabilizing device readily adaptable for mounting on a vehicle either within or without the trunk thereof.

A still further object of the present invention is to disclose and provide a vehicle stabilizing device wherein a weight member is constructed and arranged for cooperation with a restraint means and assembled within a housing so as to comprise a virtually sealed unit for protection against foreign particles and thereby providing essentially maintenance-free operation.

IN THE DRAWINGS:

FIG. 1 is a phantom perspective view of a vehicle showing an exemplary mounting of the device of this invention in the trunk of the vehicle.

FIG. 2 is a top view of the device shown in FIG. 1, part of the top housing being cut away to shown a top view of one end portion of the weight member within the housing.

FIG. 3 is an enlarged fragmentary sectional view taken in the vertical planes indicated by lines III—III of FIG. 2.

FIG. 4 is an enlarged sectional view taken in the vertical transverse plane indicated by lines IV—Iv of FIG. 3.

FIG. is a vertical transverse sectional view taken in the plane indicated by line V—V of FIG. 3.

FIG. 6 is an enlarged fragmentary vertical sectional view taken in the plane indicated by line VI—VI of FIG. 2.

Referring to the drawings there is shown a stabilizing device generally indicated at 10 embodying this invention and adapted to be carried by an automobile or vehicle near the rear thereof. The device 10 may be conveniently mounted within the trunk space of a passenger automobile or may be secured to the vehicle chassis or body between the rear axle assembly and bumper. Generally speaking, the stabilizing device 10 comprises a housing means 11, a weight member 12 supported within said housing for yieldable longitudinal movement thereof (that is, in a direction transverse to the direction of movement of the automobile), and means within the housing means for supporting the weight member 12.

The elongated hollow housing means 11 may comprise a bottom housing member 16 having a bottom wall 17 and upstanding sidewalls 18. Sidewalls 18 flare sidewardly outwardly from the edge of the bottom wall 17 and include a vertical longitudinal portion 19 having longitudinal edge portions 20 disposed at approximately half the height of housing means 11. Sidewalls 18 include internal longitudinal reinforcing ribs 21 and 22 for stiffening said sidewall. Preferably the bottom housing member 16 is made from a metal extrusion and may be cut to selected length.

Housing means 11 also comprises a top housing member 24 having a top wall 25 and depending downwardly and outwardly flaring top sidewalls 26 having longitudinal edge portions 27 overlying longitudinal edge portions 20 of the bottom sidewalls. Top wall 25 may be provided with a plurality of longitudinally extending parallel spaced ribs 28 for strengthening said top wall while providing a suitable decorative effect. Top housing member 24 may also be a suitable metal extrusion cut to the same length as bottom housing member 16.

At opposite ends of the top and bottom housing members may be provided end caps 30. Each end cap 30 includes a bottom wall 31 adapted to seat upon a supporting surface and provided with ports 32 for reception of securing bolt assemblies. Bottom wall 31 includes an upwardly offset tongue portion 33 of less width than the housing and adapted to be inserted therein to overlie the adjacent end portion of housing bottom wall 17. End cap 30 includes an upstanding end wall 34 having a vertical lower portion 35 integral with bottom wall 31 and braced by gussets 36 connecting wall portions 35 and 33. End wall 34 is outwardly offset as at 37 and includes an upwardly inwardly inclined upper wall portion 38 also provided with an inwardly extending tongue portion 39 underlying the top wall 25 of the top housing member. Top portion 39 is of similar configuration as bottom configuration as bottom tongue portion 33 and is reinforced by gussets 40 interconnecting portions 39 and 38. Upwardly inclined wall portion 38 terminates in a top flange 41 which may be flush with top wall 25. Inwardly of end wall 34, each end cap 30 may be provided with a vertically disposed partition 43 having a central boss 44 serving to position one end of a spring as later described. The outer face of wall portion 38 may be provided with a suitable longitudinal recess 46 adapted to provide a space for embossed or other identification or advertising material.

Weight member 12 may comprise a single solid bar of suitable metal and of selected weight, such as 40—80 pounds, and spaced from each end cap 30. It will be understood that the weight of the member 12 is selected in accordance with the overall weight of the vehicle to which the device is to be attached.

Means for supporting weight member 12 within the housing means 11 may comprise internal U-section support members 50 each including a bottom wall 51 and upstanding parallel sidewalls 52, said bottom wall 51 being secured in suitable manner as by rivets or bolt assemblies to bottom wall 17 of the housing bottom member 16. In this example two support members 50 are employed, one at each end of weight member 12, although it will be understood that the support means may comprise a single elongated support channel. Sidewalls 52 are provided with transversely aligned top ports 54 and bottom ports 55.

Weight supporting and restraint means may comprise top and bottom sets of rollers 57, 58 extending between sidewalls 52 and provided with roller or axle ends 59 and 60, respectively, which projects through ports 54 and 55. Adjacent each sidewall each roller 57, 58 is provided with a shouldered roller member 61, 62 having respective flanges 63, 64 and inwardly extending cylindrical portions 65, 66 respectively to define a shoulder with angularly related faces within which may be received top and bottom longitudinal edge corners 67 and 68 of weight member 12. Thus, in normal inactive position, weight member 12 rests upon the cylindrical portions 66 formed by roller members 62 on the bottom set of rollers. The upper set of rollers 57 and shouldered roller members 61 serve to limit vertical movement of the weight member in the event the vehicle passes over a severe bump or rough surface. The flanges 61, 62 on the shouldered rollers limit lateral movement of the weight member 12 with respect to its longitudinal axis. Thus, weight member 12 is confined with respect to lateral movement in relation to its axis and its yet permitted relatively free longitudinal movement on the shouldered rollers 62 of the bottom rollers 58.

Means for yieldably resiliently limiting longitudinal movement of weight member 12 with respect to its axis may comprise coil spring members 70 extending between end caps 30 and adjacent ends of weight member 12. One end of a spring member 70 is positionable on inwardly extending boss 44 on end cap 30. The opposite end of spring member 70 is positionable on a boss 71 provided on an end cap 72 fitted on the end of weight member 12. Thus, longitudinal movement of weight member 12 will be resiliently resisted by spring members 70.

Means for dampening movement of weight member 12 may comprise a suitable pad 74 (FIG. 6) of selected area resiliently biased against the top face of weight member 12 by an elongated spring member 75. Spring member 75 is readily held in pressure engagement and in assembly with weight member 12 by slipping a U-section end 76 beneath the normally nonrotating roller 57 for reception of the roller 57 within the U-section. Spring member 75 is then provided with a downwardly turned loop section 77 which merges with a straight flat section 78 lying parallel to weight member 12 and to which the pad 74 may be secured in suitable manner as at 74a. Spring member 75 is then upwardly inclined to contact at 75a the bottom surface of the top wall 25 and then terminates in end section 79 bent slightly downwardly. Spring member 75 may exert a pressure of approximately 30 to 50 pounds on the pad 74.

Pad 74 may be made of a Teflon composition which is particularly wear resistant and may be bronze filled or may include a glass fiber molybdenum disulfide composition. Such Teflon composition material provides a low coefficient of friction at low velocities, the coefficient of friction more rapidly increasing at higher velocities. Thus, in a violent skidding maneuver the teflon pad under 30 to 50 pounds pressure would effectively dampen forces tending to cause the weight member to oscillate. Thus, the teflon pad 74 provides sufficient frictional engagement with weight member 12 to serve as a dampening or snubbing means for movement of weight member 12 in response to end springs 70 and other lateral forces acting thereupon during operation.

Assembly of the stabilizing device 10 may be readily accomplished. Rollers 57 and 58 may be assembled with shouldered rollers 61 and 62 thereon with the U-shaped support members 50 before the support members are secured to the housing bottom member 16. Weight member 12 may then be inserted between the top and bottom sets of rollers and may slidably rest upon the bottom shouldered rollers 62. End caps 30 may be assembled with the housing bottom member and secured by suitable rivets Springs 70 may then be inserted between end cap members 30 and ends of the weight member 12. Housing to top member 26 may then be placed over the assembly and pressed downwardly so that as the downwardly outwardly flaring walls 26 pass over the edge portion 20 of the bottom wall the two housing parts will be interlocked by interengagement of the shoulders at 80 throughout the length of housing members 16 and 24.

Rollers 57 and 58 are restrained against longitudinal movement with respect to their axes by the housing members 16 and 24, respectively. It will be noted that ribs 21 of the housing bottom members 16 are extended into adjacent proximate, almost contacting relations with end faces of roller 58. Thus when the bottom housing member 16 is assembled with the roller 58 and U-shaped base member 50, the rollers 58 are held against axial movement. The top housing member 24 is provided on each wall 26 with an inwardly extending protuberance or longitudinal bead 81 which is aligned when in assembly with the end face of top rollers 57 so that as the top housing member 24 is snapped into interlocked relationship with the bottom housing member protuberances 81 will be positioned in proximate relationship to end faces of the rollers and will limit axial movement of rollers 57.

In operation of the stabilizing device 10 it should be noted that springs 70 are compression springs having substantially equal compressive characteristics so that when the device is properly mounted in a vehicle the midpoint of weight member 12 will lie in a longitudinal plane bisecting the vehicle. The stabilizing device 10 responds to lateral forces acting upon the vehicle such as those which occur during side sway and skidding of the car. When the rear of the car tends to skid in one lateral direction or to one side, such motion is relative to weight member 12, which, because of its initial inertia, will tend to remain steady and still. The relative movement occurring between the car and the weight member will cause compression of one of the end springs 60 which then transmits to the vehicle a counteracting biased force to offset and reduce the lateral acting force components causing the skid. Thus, sway or skidding of the rear end of the vehicle is minimized and wheels are held in better ground engagement for stability and traction.

After the lateral force components are counteracted by the stabilizing device, there will occur relative movement of the vehicle and weight in the opposite relation. To dampen and absorb such forces the dampening means 74 provides frictional forces acting on the weight member tending to inhibit such opposite relative movement of the weight member and vehicle.

Movement of weight member 12, except in its longitudinal direction is positively restrained by restraint means comprising the top and bottom shouldered roller members 57, 58 which under some conditions may also tend to provide supplementary frictional forces serving to dampen longitudinally directed pulsation or other action of weight member 12. Unwanted lateral force components (with respect to the axis of the weight) which might cause lateral pulsations or resonance relative to the vehicle are thus positively limited and controlled. Thus, the weight member is restricted and restrained in its movement laterally of its axis, but yet is relatively free in a resilient yieldable manner in its movement longitudinally of its axis so as to immediately and properly respond to skidding or swaying forces acting upon the vehicle.

It is important to note that the construction of the stabilizer device described above is simply and readily assembled in an effective efficient manner and upon assembly is essentially sealed against dirt or other foreign matter which might interfere with a fully effective response by the weight member to sideways forces acting upon the vehicle. While the stabilizing device 10 is exemplarily mounted in the trunk of a vehicle, it will be understood that it may be mounted externally of the vehicle and at other suitable locations where it will not interfere with other parts of the vehicle and their operation.

Various modifications and changes may be made in the stabilizing device described above which come within the spirit of this invention and all such changes coming within the scope of the appended claims are embraced thereby.

We claim:

1. In a device for stabilizing sideward sway of a vehicle and adapted to be mounted transversely of the direction of travel of said vehicle, the combination of:

an elongated hollow housing means including sidewalls and end walls;

an elongated weight member within said housing means, and defining therewith a space;

means at opposite end portions of said weight member for restraining said weight member against movement in directions normal to the longitudinal axis of the weight member and comprising;

sets of top and bottom restraint members carried by sidewalls of said housing member and having surfaces engageable with opposed surfaces on said weight member, said restraint members being operable in said space;

means biasing said weight member against longitudinal movement and comprising;

spring means extending between ends of said weight member and said end walls; and friction means in said space and engageable with said weight member for dampening movement of the weight member.

2. A device as stated in claim 1 wherein said weight member includes:

angularly disposed surfaces along longitudinal edges thereof; and said sets of top and bottom restraint means include angular surfaces correspondingly disposed to said aforementioned angularly disposed surfaces on said weight element for frictional contact therewith.

3. A device as stated in claim 1 wherein said friction means includes a biased flat plate slidably engaging a surface on said weight member.

4. A device as stated in claim 1 wherein said housing means includes:

sidewalls having transversely aligned ports for mounting said restraint means;

said housing means also including sidewalls extending over said ports for holding said restraint members against axial movement.

5. A device as stated in claim 1 wherein said restraint means includes roll members provided with shoulders engageable with edges of said weight member.

6. In a device as stated in claim 1 wherein said friction means includes a member connected with one of the restraint members and biased against a wall of the housing means.

7. In a stabilizing device for a vehicle, the combination of: an elongated hollow housing means including:

a bottom housing member having a bottom wall and upstanding sidewalls projecting upwardly for a portion of the height of the housing; internal U-shaped housing portions secured to said bottom wall adjacent ends of said housing;

and having top and bottom aligned ports;

top and bottom sets of roller members provided with axles having ends carried in said aligned ports;

said roller members each including a shouldered roller at each end thereof;

a weight member of rectangular cross-sectional shape supported on said shouldered rollers of said bottom roller members and restrained against vertical displacement by said shouldered rollers of said top roller members;

spring means at opposite ends of said housing means for yieldably resiliently restraining longitudinal movement of said weight member;

and a top housing member having depending sidewalls provided with longitudinal bottom edges adapted to interlock with top longitudinal edges of said bottom sidewalls;

said sidewalls being provided with inwardly directed protuberances engageable with end faces of said roller member axles for holding said axles against longitudinal movement.

8. In a device as stated in claim 7 including:

dampening means for said weight member including a spring member connected with one of said roller members and biased against a wall of said housing member; and a friction pad carried by said spring member and biased against said weight member.

9. In a device as stated in claim 8 wherein said friction pad includes a material having a low coefficient of friction at relatively slow movement of said weight member in response to laterally acting forces and having a high coefficient of friction at relatively rapid response to laterally directed forces moving said weight member.